Figure 1:
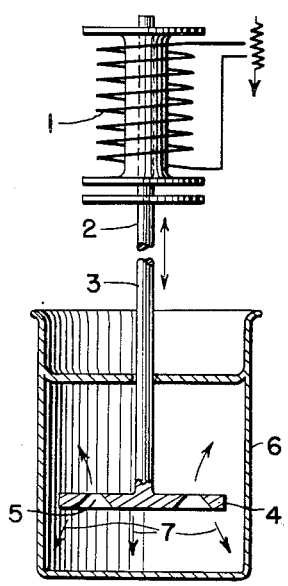

Oct. 28, 1952     H. MÜLLER     2,615,692
DEVICE FOR MIXING, STIRRING, EMULSIFYING, ETC
Filed Feb. 3, 1949     4 Sheets—Sheet 1

INVENTOR
HANS MULLER
BY *Leonard L. Kalish*
ATTORNEY

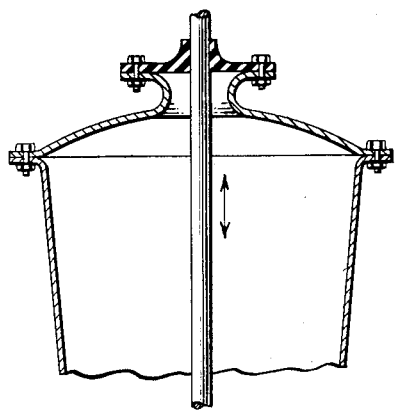
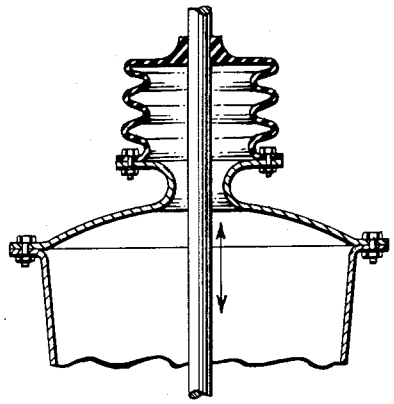
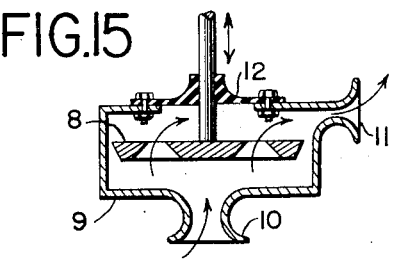
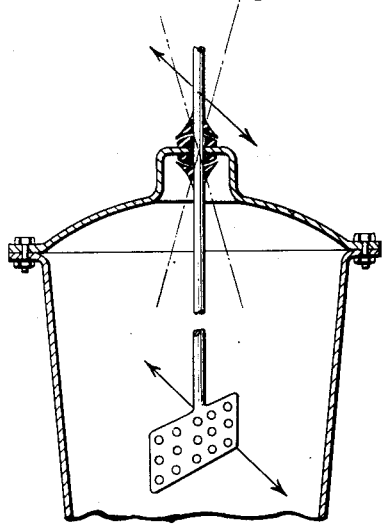
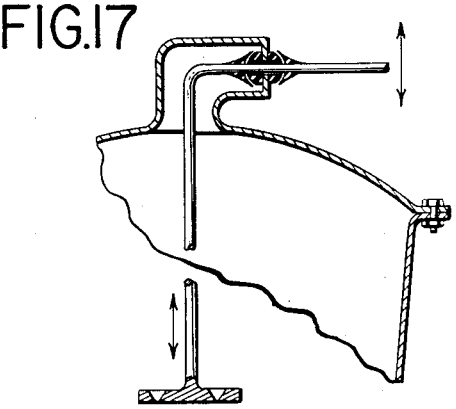
INVENTOR
HANS MULLER

Oct. 28, 1952 — H. MÜLLER — 2,615,692
DEVICE FOR MIXING, STIRRING, EMULSIFYING, ETC
Filed Feb. 3, 1949 — 4 Sheets-Sheet 4
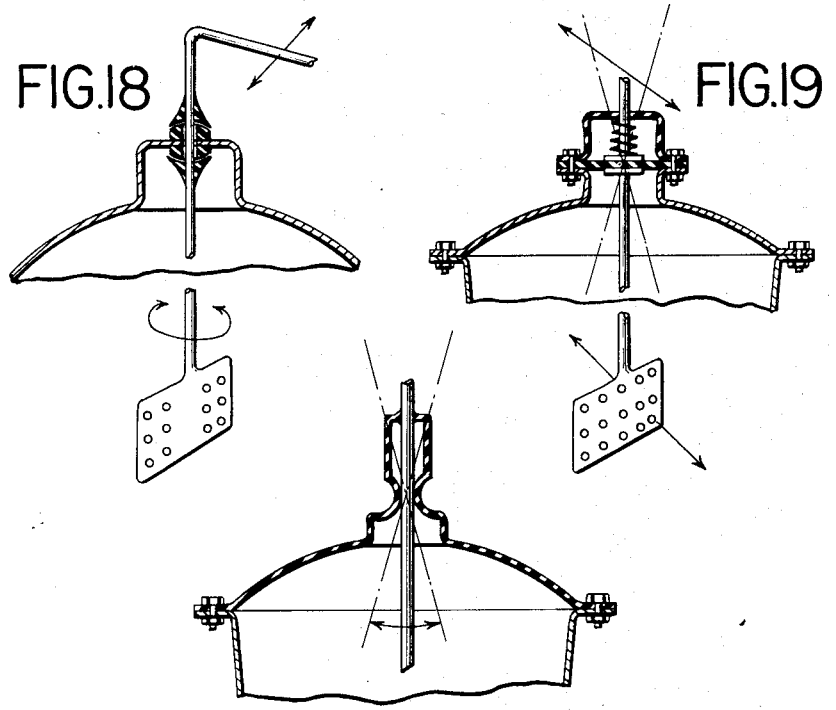
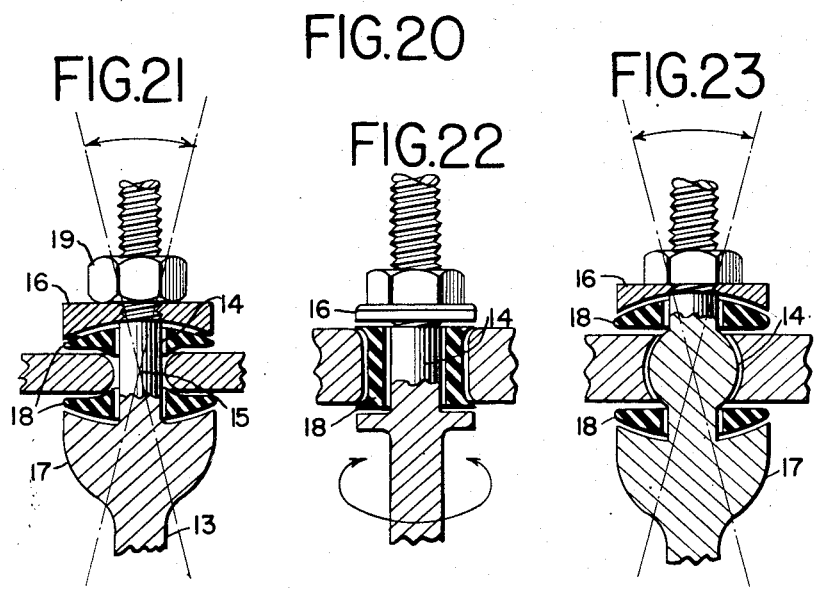
INVENTOR
HANS MULLER
BY Leonard L. Kalish
ATTORNEY Patented Oct. 28, 1952

2,615,692

UNITED STATES PATENT OFFICE 2,615,692

DEVICE FOR MIXING, STIRRING, EMULSIFYING, ETC.

Hans Müller, Erlenbach/Zurich, Switzerland

Application February 3, 1949, Serial No. 74,434
In Switzerland February 5, 1948

12 Claims. (Cl. 259—113)

In laboratories, industrial concerns and also in domestic use mixing machines are employed for mixing, stirring, emulsifying, etc. in which a rotary part (agitator, emulsifying rotor) performs the required work. A motor or other rotary power unit therefore has to be used to provide the drive. When the mixing operation must be intensive, as is the case, for example, in the process of emulsification, considerable rotary speeds frequently have to be employed, presenting the known disadvantages of heavy wear and tear and high power consumption. If the stirring or emulsifying operation is to be carried out in a closed receptacle, the rotary spindle must moreover be led through a stuffing box in respect of which latter the problems of sealing are very difficult of solution, especially when corrosive substances have to be mixed or emulsified. It has, for example, not hitherto been possible to lead an enamelled agitator shaft through a stuffing box, with the result that with enamelled agitators the non-enamelled portion passing through the stuffing box is subject to very pronounced corrosion.

The use of agitators set in vibratory motion for mixing, stirring and emulsifying purposes has already been proposed. Tests with vibrating agitators, i. e. such as perform what is essentially a reciprocating movement, were carried out in particular because of the fact that the introduction of reciprocating shafts into closed receptacles is appreciably simpler than that of rotary shafts. The devices so far known designed on the vibratory principle have, however, not been able to secure acceptance because the generally required turbulence of the liquid to be mixed or emulsified was not achieved.

The present invention relates to a device for mixing, stirring and emulsifying which operates with vibratory means and at the same time ensures the production of turbulence in the liquid to be mixed or emulsified of a degree at least equal to that produced in the devices operating with rotating agitators. The device in accordance with the invention is characterized by the provision of an agitator shaft or spindle projecting into the medium to be treated, which shaft or spindle can be set in vibratory motion by electric or mechanical means and on which means are provided which during said vibratory motion lie in the liquid with at least one surface at an angle to the direction of vibratory motion. The extensive tests carried out with a device constructed on this principle have demonstrated that with this device regulation not only in respect of the intensity but also in respect of the direction of turbulence, is obtainable.

The enclosed drawing shows a number of typical embodiments of the invention, as follows:

Fig. 1 a simple embodiment of a mixing device in accordance with the present invention, Figs. 2–10 various embodiments of the agitator, Figs. 11–14 various methods of introducing the agitator rod into closed containers, Fig. 15 a device in which the means provided by the invention are used, for pumping, Fig. 16 a further embodiment of the agitator for the introduction of gases, Figs. 17–21 various embodiments of devices according to the invention in which the vibratory motion of the agitator is not performed axially, Figs. 22–23 a number of methods of mounting agitator rods at the point of introduction into closed containers.

Fig. 1 shows such a vibratory mixing and emulsifying device of the most elementary design. An ordinary coil 1 with a core 2 is used as the driving means for producing the vibratory motion. The vibrating core 2 is connected direct to the agitator shaft or rod 3 and this latter oscillates with the core 2. The vibratory agitator rod carries as the mixing organ a simple plate 4 provided with tapering holes 5. When the agitator moves downwards, the liquid rushes upwards through these holes, as the latter taper towards the top and the liquid is therefore forced to converge to a smaller diameter. When the agitator moves upwards, a small quantity of liquid flows in the opposite direction i. e. downwards, but this quantity is many times smaller than that which flowed upwards, this cycle manifesting itself in a pronounced upward flow (as the resultant of the two currents). By extension of the vibratory path this circulation can easily be stepped up to a fountain-like spurt of the liquid in the vessel 6. The mixing effect in the container 6 is extremely intense. As far as the emulsifying action is concerned, this is produced not only by circulation, but also and primarily by the shattering action exerted by the plate itself on the particles of liquid. The particles of liquid are hurled in the direction of the arrows 7 against the walls of the container, which can easily be observed if, for example, undissolved particles in a transparent liquid are subjected to this vibration.

Needless to say, a mechanical drive (e. g. an eccentric) may be used as the source of vibration in the above described device. The change in direction should always be as violent as possible. The agitator may be of various alternative shapes.

Figure 2:
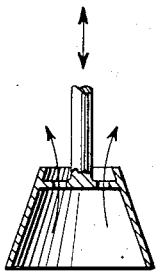

Fig. 2 shows a form of agitator which corresponds in principle to that shown in Fig. 1. Instead of the plurality of small tapering holes, one single large cone, whose base is provided with holes, is employed. The quantity of liquid circulated by this agitator is very great indeed, but the shattering action is diminished to some extent owing to the absence of the horizontal plate.

Figure 3:
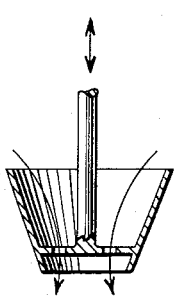

In the case of the agitator as in Fig. 3 the direction of flow is downwards. This agitator is used in cases where it is necessary to stir up heavy particles from the bottom of the container.

Figure 4:
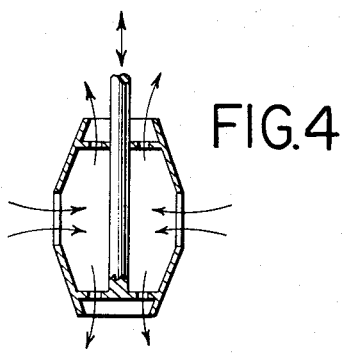
Figure 1A:
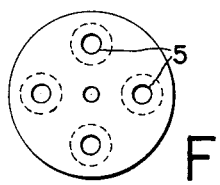

In the embodiment according to Fig. 4 two conical agitator elements are provided, one conical element producing an upward flow and the other a downward flow. Needless to say, a plurality of such elements may be arranged on the same agitator shaft or rod, it being possible, in principle, to achieve any desired direction of flow.

Figure 5:
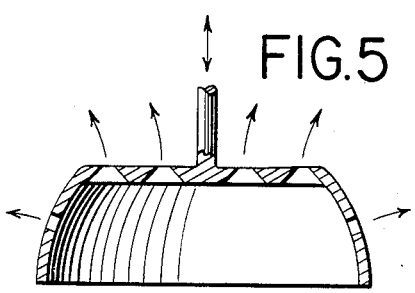

One particularly effective form of agitator is the dome shown in Fig. 5, said dome being provided with holes at its closed end. The liquid is forced into the dome by the vibratory movement and escapes at high speed through the holes.

Figure 6:
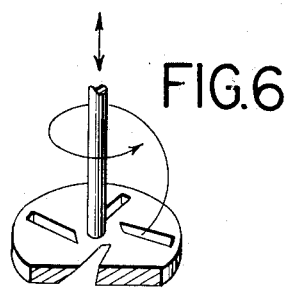

Generally speaking, vibratory agitation affords the great advantage over rotary agitation that the liquid is not set in rotation, the agitating action rather taking effect in all directions. If in special cases rotation of the contents of the container is preferred, this can be achieved by vibratory agitation if the holes or slots through which the liquid is forced by the vibration are arranged in such direction that a tangential component is produced. The liquid is thereby automatically set in rotation. An agitator of this type is illustrated in Fig. 6.

Figure 7:
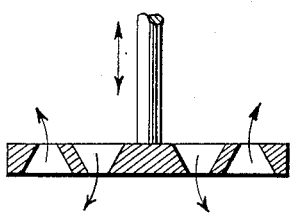

If a powerful agitating or circulatory effect in both a downward and an upward direction is desired, the agitator is advantageously provided with tapering holes some of which taper inward towards the bottom and the others inward towards the top (Fig. 7). This produces a vigorous circulation in both directions. This is, for example, of particular advantage in distilling, when the liquid is required on the one hand to sweep vigorously against the lower heating surface and on the other hand to be flung upwards into the vapour space. Powerful upward turbulence into the upper space is also desirable in cases where the absorption of gases is required; in many cases a downward action is required when powdered catalysts have to be violently stirred up (hydrogenation, etc.). The time required for such processes of gas absorption and the gaseous reaction is many times reduced by this method of agitation.

Figure 8:
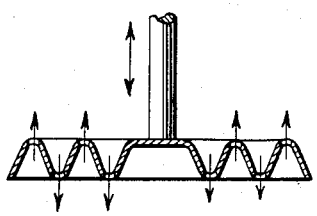

Fig. 8 shows a simplified form of the embodiment according to Fig. 7. This is achieved by designing the agitator in undulations or corrugations, the peaks and troughs of the undulations being pierced. This type of agitator also produces simultaneous upward and downward turbulence.

Figure 9:
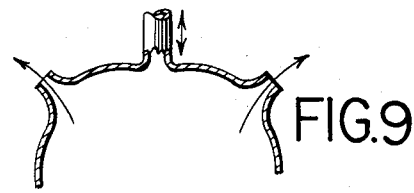

If a more lateral direction of flow is desired, the holes may simply be arranged laterally (in the dome-shaped embodiment, for example) or the flow may be deflected by means of a baffle-plate secured to the agitator (Fig. 9).

It has transpired that in the case for example of reactions in which gases have to be introduced, the vibratory agitator is eminently suited for beating up into the most minute bubbles the gases introduced. Instead of large, rising bubbles, a fine gaseous foam is produced which is equally distributed throughout the liquid and consequently possesses a very large surface area. The gases are therefore absorbed much more quickly and efficiently.

Figure 10:
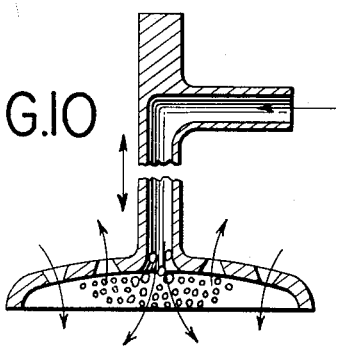

For the purpose of introducing the gases the agitator shaft or rod may be hollow (Fig. 10). The gases then escape in the centre of the agitator plate or agitator dome and are thoroughly mixed with the liquid and beaten up into small bubbles first in the inlet tube (rod) and then still more thoroughly in the dome itself.

Figure 11:
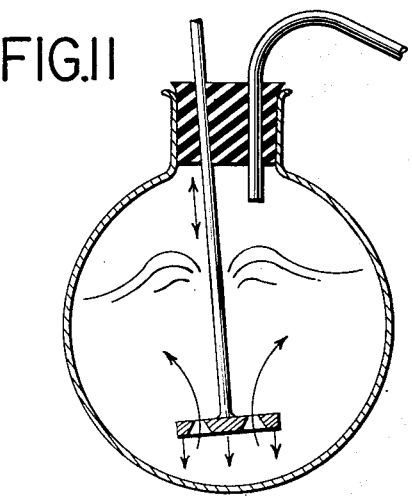

An outstanding advantage of the vibratory agitator resides, as mentioned in the preamble, in the fact that the agitator shaft or rod does have to run in bearings as is the case with the rotary agitator. The vibratory agitator is simply inserted into the container and is ready for operation. There is no lubrication of bearings, no straightening of shafts, etc. (Fig. 11).

Figure 12:
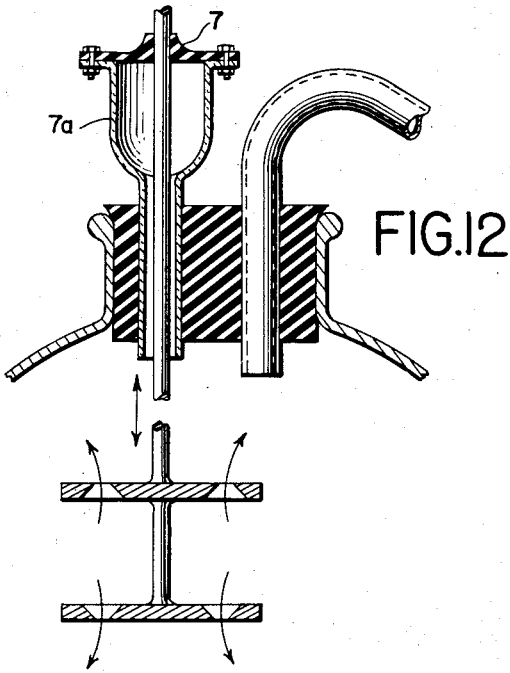

If, for example, in the case of a laboratory agitator as shown in Fig. 12 hermetic closure is desired, no stuffing box and no mercury seal is needed with the vibratory agitator. A small diaphragm 7 made of rubber, synthetic material or, for higher temperatures, of silicone, through which the agitator is inserted and which is drawn or screwed over a constructed glass tube 7a, ensures a perfect seal.

Technical agitator units can also be sealed by means of one of the above-mentioned diaphragms. Enamelled embodiments (Fig. 13) afford particularly great advantages in this connection.

In the embodiment as in Fig. 14 a resilient metal tube is provided instead of the diaphragm in a technical agitator unit. This embodiment is particularly suitable for use under conditions of high temperature and pressure.

As has been shown in the foregoing, a considerable degree of circulation is achieved by means of the vibratory motion with a suitable form of agitator, appreciable liquid pressures arising at the constricted ends of the tapering holes. Now if, as exemplified for example in Fig. 15, one of the above-described agitators 8 is fairly closely surrounded by a housing 9, said housing 9 being provided with an inlet aperture 10 and an outlet aperture 11, the system can readily be used as a circulation pump. No stuffing box is required in this case either, this again being replaced by a diaphragm. As, furthermore, no valves are required, the device in accordance with Fig. 15 represents a circulation pump without stuffing boxes or valves which is most eminently suited for use with corrosive liquids.

The vibratory motion need not, however, inevitably take place in the axial direction of the agitator rod; the vibratory motion may be performed in any other direction in respect of this latter (e. g. perpendicular thereto).

Thus the agitator rod may, for example, possess a fulcrum about which it is set in vibration. The direction of drive is then likewise perpendicular to said shaft or rod. The agitator elements, i. e. the actual agitators, remain in principle the same, the difference being merely that some of them are secured in a somewhat different manner to the agitator rod. The flow in the container will then, of course, accordingly be in a different direction in relation to the agitator rod.

Fig. 16 exemplifies a device in which the agitator shaft or rod possesses a pivotal point in the lid of the container. It is driven from above, either perpendicularly or obliquely to the shaft or rod on which the agitator elements are secured in the manner described.

In the embodiment as in Fig. 17 a vibratory drive is shown with the help of which a terminal vibration in the axial direction of the agitator rod is produced, the drive being transmitted via a rod with a pivotal point (rocker lever).

It has also been found that in many cases a "rotary vibration" may also be of advantage. In such a case the agitator shaft, as shown in Fig. 18, is set in rotary vibration by means of a lever arm (or directly by means of a suitably designed vibrator). The shaft commences to rotate in one direction, but changes the direction of rotation. Here again the same agitator elements may, in principle, be employed.

It is evident from the foregoing that if the individual agitator elements (plates with tapering holes, slots, domes, etc.) are secured in an appropriate manner to the agitator shaft or rod, said shaft or rod may be vibrated in any direction whatsoever, a suitable circulatory agitating or emulsifying effect always being achieved. If, for example, a plate with tapering holes is secured with the plane of the plate perpendicular to the agitator shaft or rod, the most efficient circulatory and agitating action is produced when the agitator rod is set in vibration in the axial direction of said rod. The liquid then likewise circulates more or less in the axial direction of the rod. If, on the other hand, the plate provided with tapering holes is fitted with its plane parallel to the agitator rod, the agitator rod is preferably set in transverse vibratory motion, i. e. with a fulcrum or pivotal point on the agitator rod. In this case the vibratory drive must be perpendicular to the plane of the plate in order to achieve the maximum effect. The liquid then circulates principally transversally to the agitator rod. If such a vibratory agitator is arranged eccentrically to the central axis of the container, a rotation of the liquid about the axis of the container can easily be achieved.

The described transversal and torsional vibrations are primarily of interest for agitator devices in pressure vessels. If, for example, an agitator element is incorporated in an autoclave, difficulties may be caused, when using the vibratory action in the longitudinal direction of the agitator rod, by the sealing member, e. g. the above-mentioned co-vibrating diaphragm, markedly damping the vibration, since at each oscillation against the pressure within the vessel said pressure has to be overcome. The vibratory drive therefore always has to overcome this pressure. Of course, this energy is recuperated at the counter-movement away from the vessel in that the diaphragm exerts an outward pressure. If therefore the vibratory drive is, for instance, designed in such a way that it can utilize this reactive force (e. g. by means of an energy accumulating member such as a flywheel, spring, etc.), practically no loss of energy is incurred as a result of the pressure to be overcome. Nevertheless the driving member is thereby rendered somewhat more complicated, which is undesirable, especially in the case of small units. Even with the use of an ordinary A. C. vibrator, this would complicate the drive. In order to remedy this deficiency, an embodiment in accordance with Fig. 20 may be chosen, or a counterspring may be attached to the outside of the diaphragm, being placed under such tension that it counterbalances the pressure in the vessel (see Fig. 19). Upon any change in the pressure within the vessel, however, this counterspring must always be correspondingly adjusted, which although it could be carried out automatically, renders the drive even more complicated.

In the case of transversal vibratory motion on a pivotal point, or of torsional vibratory motion, these complications are eliminated. If the pivotal point is fixed at that point where the agitator rod passes through the closure of the container (Fig. 16), the vibratory motion can be transmitted to the interior of the container without the motion being prevented by the pressure within the vessel. Figs. 21–23 show a number of typical embodiments of the closure, i. e. the design of the pivotal point.

Fig. 21 shows a simple sealing member consisting in the passage of the agitator rod 13 through a suitable hole 14 in the vessel. The hole 14 is preferably bellied somewhat, so that the agitator rod 13, which pivots about the point 15, can easily roll. By means of the clamping plate 16 and the adapter shoulder 17, a packing insert 18 made of plastic material (rubber, synthetic rubber, silicone, teflon, etc.) is clamped both inside and out and takes care of the requirements of sealing. As the agitator arm only moves a small distance at its pivotal point 15, the movement can be performed in spite of the packing, since the plastic sealing material yields slightly. According to compression within the vessel, the pressure can be increased or reduced by means of the nut 19. With a seal of this nature the highest boiler pressures can be overcome, that is to say, even pressures of 200–300 gauge atmospheres and over. Fig. 23 shows in principle the same type of seal but with a spherical seating for the agitator arm. This is of advantage, for example, in the case of large and heavy agitator members, in that the weight of the agitator is taken by the spherical support.

The embodiment as in Fig. 22 is used primarily for torsional vibration. In this case the plastic material is arranged round the agitator shaft, bearing against the collar 17 at one end and against the disc 16 at the other. Here again the movement is so slight that there is no hindrance to the transmission of the vibration.

As the described typical embodiments show, the present invention solves in a surprisingly simple manner the problem of stirring, agitating, mixing, emulsifying, etc., the effect achieved substantially surpassing those obtained with the known types of agitator devices. Needless to say, the embodiments described are only typical and further special forms of agitators can be constructed on the principle of the invention. The device according to the invention can, of course, be used not only in the chemical field but also in all conceivable spheres of technology.

I claim:

1. A vibratory mixer comprising a relatively thin elongated shaft constructed and arranged to extend down into a body of liquid or the like, a transversely enlarged relatively inflexible and form-retaining mixing member fixedly mounted on said shaft in fully-submerged relationship to the liquid, mechanism operatively connected to the upper end of said shaft for causing said shaft and said mixing member to oscillate at relatively high frequency and small amplitude, and means providing tapered liquid passageways extending through the mixing member generally in the direction of oscillation whereby liquid trapped in the larger ends of the tapered openings by the on-coming mixing member is compressed and forced out of the smaller trailing ends of said openings and is discharged in the opposite direction at considerably higher speed than the speed of the mixing member, thereby to cause circulation of the liquid through and appreciably beyond the mixing member in the direction of taper.

2. A vibratory mixer comprising a relatively thin elongated shaft constructed and arranged to extend down into a body of liquid or the like, means operatively connected to the upper end of said shaft for causing it to oscillate axially at relatively high frequency and small amplitude, and a relatively inflexible and form-retaining mixing member fixedly mounted upon said shaft in fully-submerged relationship to the liquid, said mixing member being enlarged generally transversely relative to the direction of oscillation and having passageways formed therein, said passageways being tapered generally in the direction of oscillation, whereby liquid is trapped in the larger ends of the passageways by the on-coming mixing member and is forced therethrough under pressure to emerge from the smaller ends of said passageways at a speed greater than that of the mixing member so as to cause the liquid to circulate through and beyond the mixing member in the direction of taper to an extent appreciably greater than the amplitude of oscillation.

3. A construction according to claim 2 wherein the openings in the mixing member all taper in the same axial direction whereby there is continuous pulsating flow through and beyond the mixing member in the direction of taper with alternating pumping and return strokes of the mixing member.

4. A construction according to claim 2 wherein some of the openings taper in one axial direction and the remaining openings taper in the other direction whereby there is generally continuous pulsating flow through and beyond the mixing member in both axial directions.

5. A construction according to claim 2 wherein the mixing member is generally cylindrical and co-axial with the shaft and wherein the openings are circumferentially spaced upon the mixing member.

6. A construction according to claim 2 wherein the mixing member is more or less circular in contour and is co-axial with the shaft and wherein the passageways are arranged in circles of different radii with all the passageways in one circle tapering in a single axial direction and with all the passageways in the next adjoining circle tapering in the other axial direction.

7. A construction according to claim 6 wherein the mixing member is formed of relatively thin sheet material which is corrugated axially and radially to provide concentric circular tapered crests and troughs with a plurality of circumferentially-distributed openings formed along each crest line and each trough line.

8. A construction according to claim 2 wherein the passageways, in addition to being axially tapered, also extend obliquely whereby the liquid forced through the smaller ends thereof is given a spiral motion.

9. A construction according to claim 2 wherein the shaft is hollow whereby fluid can be sent downward therethrough and can emerge into the liquid adjacent the mixing member.

10. A construction according to claim 1 wherein the shaft passes through a gas-tight cover in sealing relationship therewith, said cover being formed at least in part of resilient material capable of yielding in both directions with the oscillating movement of the shaft.

11. A construction according to claim 2 wherein the shaft passes through an opening in a gas-tight cover in fluid-tight sealing relationship therewith, the cover being formed at least in part of resilient material with respect to which the shaft can slip freely during oscillation without impairing the fluid-tight relationship therebetween.

12. A construction according to claim 2 wherein the shaft passes through a gas-tight cover formed at least in part of resilient material capable of gripping the shaft in fluid-tight sealing relationship therewith and capable of flexing sufficiently to permit the vibratory axial oscillation of the shaft.

HANS MÜLLER.

REFERENCES CITED

The following references are of record in the file of this patent:

UNITED STATES PATENTS

| Number | Name | Date |
|---|---|---|
| 1,623,987 | Wahl | Apr. 12, 1927 |
| 1,776,405 | Wilsey | Sept. 23, 1930 |
| 2,281,094 | Chambers | Apr. 28, 1942 |
| 2,291,708 | Gluck | Aug. 4, 1942 |

FOREIGN PATENTS

| Number | Country | Date |
|---|---|---|
| 93,993 | Austria | Aug. 25, 1923 |
| 354,403 | Great Britain | Aug. 31, 1931 |